United States Patent [19]
Ishitobi

[11] Patent Number: 5,609,657
[45] Date of Patent: Mar. 11, 1997

[54] COMPOSITION FOR TEXTURING MAGNETIC DISK

[75] Inventor: Ken Ishitobi, Shiojiri, Japan

[73] Assignee: Showa Denko K.K., Tokyo, Japan

[21] Appl. No.: 604,837

[22] Filed: Feb. 22, 1996

[51] Int. Cl.⁶ .................................................. B24D 3/34
[52] U.S. Cl. ................................................. 51/309
[58] Field of Search ........................... 51/304, 306, 309; 501/12

[56] References Cited

U.S. PATENT DOCUMENTS

| | | |
|---|---|---|
| 3,887,524 | 6/1975 | Kirchner et al. |
| 4,047,965 | 9/1977 | Karst et al. |
| 4,738,885 | 4/1988 | Matsumoto. |
| 4,808,463 | 2/1989 | Yoshikatsu et al. |

Primary Examiner—Deborah Jones
Attorney, Agent, or Firm—Sughrue, Mion, Zinn, Macpeak & Seas

[57] ABSTRACT

The composition for texturing a magnetic disk contains 0.1–5 weight %, based on the composition, of polycrystalline sintered alumina abrasives in a grinding fluid, the abrasives being produced by a sol-gel method comprising the steps of mixing a slurry of alumina hydrate with a dilute acid for solation, mixing the resultant alumina hydrate sol with a seed and/or a modifier, drying said alumina hydrate sol at 50°–120° C. for gelation, pulverizing and classifying the resultant gel, calcinating said gel at 400°–900° C., sintering the calcinated alumina particles at 1100°–1400° C., and pulverizing and classifying the resultant sintered alumina particles to a maximum particle size of 5 μm or less and an average particle size of 0.1–3 μm.

6 Claims, 2 Drawing Sheets

COMPOSITION FOR TEXTURING MAGNETIC DISK

BACKGROUND OF THE INVENTION

The present invention relates to a composition for texturing a magnetic disk for providing the magnetic disk with texture grooves, and more particularly to a texturing composition for providing a surface of the magnetic disk with uniform texture grooves.

Remarkable advancement has recently been achieved for various computers including personal computers, accompanied by wide use of hard disk drives as external memory devices. The hard disk drive comprises one or more magnetic disks rotatable at a high speed and a magnetic head slightly floating on a surface of each magnetic disk for reading and writing digital signals. The magnetic disk generally has a layer structure comprising a substrate made of aluminum, etc., a primer layer made of Ni—P plating, etc., a magnetic layer formed by a coating method, a vapor deposition method, a sputtering method, etc., and a protective layer made of carbon, etc.

To meet the demand of memory density which is recently more and more increasing, a magnetic head is positioned closer to a surface of the magnetic disk, for instance, at a distance of about 0.1–3 µm. Accordingly, the magnetic disk should have as flat a surface as possible, but the flattening of the magnetic disk surface increases a likelihood of a magnetic head sticking to the magnetic disk surface, thereby causing a trouble that the hard disk drive cannot be started.

To prevent the sticking of the magnetic disk to the magnetic disk surface, a primer layer lying beneath a magnetic layer in the magnetic disk is usually subjected to a texturing treatment. The texturing treatment comprises slidably pressing a grinding tape having abrasives of proper sizes attached to a surface thereof or a suspension of abrasives onto a surface of the primer layer of the magnetic disk in order to form fine texture grooves on the primer layer surface. In this case, it is necessary that the texture grooves are large enough to prevent the sticking of the magnetic head and small enough to prevent collision against the flying magnetic head. Further, the texture grooves should sufficiently be uniform.

Conventionally used as texturing compositions for forming such texture grooves are slurries comprising single-crystalline diamond abrasives obtained by high-pressure synthesis or single-crystalline fused alumina abrasives and grinding fluids which are water-soluble or insoluble grinding agents diluted with water. However, the single-crystalline diamond abrasives are expensive. Also, only a low texturing treatment speed is achieved with the single-crystalline alumina abrasives, and even when roughness of the textured surface is reduced, uneven texture grooves are obtained with a lot of scratches and burrs on the textured surface. The term "scratches" means linear deep grooves formed on the surface, much larger in width and depth than other texture grooves. The scratches are defined herein as grooves twice or more as large as other texture grooves in width or depth. The term "burrs" means projections remaining on the surface after abrasion with fine abrasives, and they are defined herein as projections of 1 µm or more in length and 0.1 µm or more in height.

Since the alumina abrasives are softer than the diamond abrasives, the alumina abrasives are so rounded to have fewer edge portions when pulverized that they less bite into an abraded surface than the diamond particles. As a result, the alumina abrasives are forced to scratch the textured surface. With such uneven texture grooves or burrs, a magnetic head moving relative to the magnetic disk while floating (flying) thereon is subjected to disturbed stress, resulting in deteriorated contact-start-stop (CSS) characteristics or crashing of the magnetic head to the magnetic disk surface which causes memory errors.

To further increase the memory density, it is necessary to reduce the surface roughness of the texturing primer layer of the magnetic disk, thereby decreasing a floating height of the magnetic head. However, if the single-crystalline diamond abrasives and the single-crystalline alumina abrasives are made small to have an average particle size of 1 µm or less, these abrasives lose their edges to have rounded shapes, resulting in extreme decrease in cuttability. As a result, the abrasives tend to slide on the disk surface being textured without fully biting into the disk, failing to obtain uniform texture grooves.

OBJECTS AND SUMMARY OF THE INVENTION

Accordingly, an object of the present invention is to provide an inexpensive texturing composition for forming sufficiently uniform texture grooves on a magnetic disk surface.

As a result of research in view of the above object, it has been found that by using abrasives of high-density polycrystalline sintered alumina prepared by a sol-gel method, sufficiently uniform texture grooves can be formed on a magnetic disk surface without scratches and burrs.

Thus, the composition for texturing a magnetic disk according to the present invention comprises abrasives of polycrystalline sintered alumina prepared by a sol-gel method, and a grinding fluid.

The abrasives contained in the texturing composition according to the present invention are produced by a sol-gel method comprising the steps of mixing a slurry of alumina hydrate with a dilute acid for solation, mixing the resultant alumina hydrate sol with a seed and/or a modifier, drying the alumina hydrate sol at 50°–120° C. for gelation, pulverizing and classifying the resultant gel, calcinating the gel at 400°–900° C., sintering the calcinated alumina particles at 1100°–1400° C., and pulverizing and classifying the resultant sintered alumina particles to a maximum particle size of 5 µm or less and an average particle size of 0.1–3 µm.

The abrasives of the present invention have an extremely high-density structure constituted by submicron crystals, and because of many sharp edge portions, they show larger cuttability (abrasive force) than fused alumina abrasives, thus exhibiting higher sharpness. As a result, too much force is not applied onto the textured surface with the abrasives of the present invention, making it less likely to have burrs at texture grooves. Further, because the abrasives of the present invention are in a block shape, they show abrasion force whose non-uniformity depending on angles of particles is much smaller than that of flat particles such as fused alumina abrasives.

Further, by adding such polycrystalline sintered alumina abrasives to a grinding fluid obtained by diluting a water-soluble or insoluble grinding agent with water, the resultant slurry can adequately adjust lubrication between the abrasives and the textured surface of the magnetic disk.

The above functions synergistically serve to produce an extremely uniform textured surface with reduced burrs and also to accelerate the removal of textured dusts, thereby achieving a textured surface with a higher cleanliness. As a result, a magnetic disk finished by forming a magnetic layer and a protective layer on the textured surface shows remarkably improved CSS characteristics.

DETAILED DESCRIPTION OF THE PREFERRED EMBODIMENTS

Figure 1:
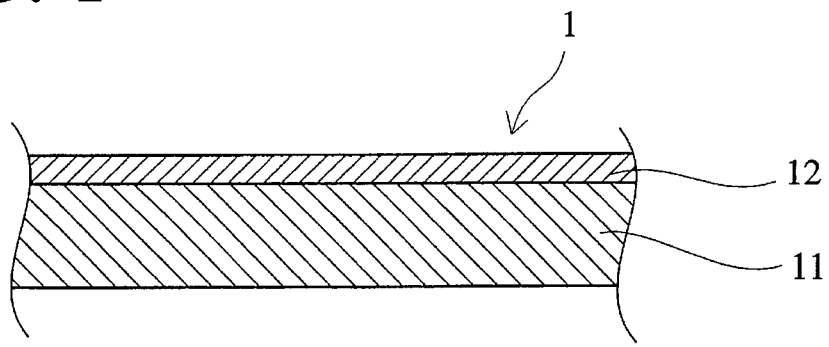
FIG. 1 is a radial cross-sectional view schematically showing a magnetic disk consisting of a substrate coated with a primer layer, which is to be textured using the texturing composition of the present invention.

The composition for texturing a magnetic disk according to the present invention and a texturing method using such a texturing composition will be explained in detail below.

[1] Texturing composition
(a) Abrasives of polycrystalline sintered alumina
(1) Production method
First, the polycrystalline sintered alumina is produced by a sol-gel method, which comprises the following steps:
1. Preparation of a dispersion of alumina hydrate,
2. Solation by adding dilute acid,
3. Addition of seed and/or modifier,
4. Gelation,
5. Uniformization (classification) of particle size,
6. Calcination,
7. Sintering, and
8. Pulverization and classification.

1. Preparation of a dispersion of alumina hydrate
The alumina hydrate is generally called "pseudo-boehmite" which is commercially available. The alumina hydrate is mixed with water to form a slurry. The content of the alumina hydrate in the slurry is preferably about 5–30 weight %.

2. Solation by adding dilute acid
The alumina hydrate slurry is changed to a sol by adding a dilute acid. Examples of usable dilute acids include nitric acid, hydrochloric acid, acetic acid, etc., and nitric acid is particularly preferable. The amount of nitric acid added is preferably 0.03–0.1 ml (67% nitric acid)/g of alumina hydrate. Of course, other dilute acids may be added in the same amounts as above.

3. Addition of seed and/or modifier
The alumina hydrate sol is mixed with a seed and/or a modifier and well stirred. Typical examples of the seeds include α-alumina, α-iron oxide, nickel titanate, etc. The amount of the seed such as α-alumina is preferably about 0.1–3 weight % based on alumina in the sol. Typical examples of the modifiers include zirconia, hafnia, yttria, magnesia, lanthania, zinc oxide, nickel oxide, cobalt oxide, etc. The amount of the modifier added is preferably about 0.1–10 weight % based on alumina in the sol, though it may change depending on the type of the modifier.

4. Gelation
The alumina hydrate sol is dried at 50°–120° C. to cause gelation. If the temperature is lower than 50° C., the drying speed is too low. On the other hand, if the drying temperature exceeds 120° C., it is difficult to reuse gels discarded in a subsequent classification step by solation.

5. Uniformization (classification) of particle size
Since the alumina gel obtained in the above step is bulky, it is pulverized by a roll mill or a hammer mill, etc. and classified to have a maximum particle size of 2 mm or less.

6. Calcination
To remove hydrated water and the remaining dilute acid from the gel particles, they are calcinated at 400°–900° C. If the calcination temperature is lower than 400° C., the hydrated water and the remaining dilute acid cannot be fully removed. On the other hand, if the calcination temperature exceeds 900° C., the alumina is converted to an α phase, making it difficult to control crystal grain sizes thereof in a subsequent sintering step. Though the calcination time depends on the temperature, it may generally be about 15 minutes to 2 hours.

7. Sintering
The calcinated alumina particles are sintered at 1100°–1400° C. in a fluidized state by a rotary kiln, etc. The sintering time may be about 1 minute to 1 hour. Polycrystalline alumina obtained by sintering has a crystal grain size which largely depends on the sintering temperature; the lower the sintering temperature the smaller the crystal grain size. The polycrystalline sintered alumina used in the present invention preferably has an average crystal grain size of 0.01–1.0 μm, more preferably 0.030–0.6 μm.

8. Pulverization and classification
The polycrystalline sintered alumina is pulverized by a ball mill, etc. and classified to a predetermined particle size range described below.

(2) Size of abrasives
To form the desired texture grooves, the alumina abrasives of the present invention preferably have a maximum particle size of 5 μm or less and an average particle size of 0.1–3 μm. Since the alumina abrasives of the present invention are produced by a sol-gel method, they have a fine crystalline structure, having sharp edge portions even with small size. By texturing treatment using the alumina abrasives having the above particle size range, it is possible to provide the textured surface with a uniform, small surface roughness.

If the maximum particle size of the abrasives exceeds 5 μm, the resultant texture grooves are too large with excessive surface roughness, and scratches are likely to be formed. The more preferred maximum particle size is 4 μm or less. If the average particle size is less than 0.1 μm, the edge portions of the abrasives are not sharp, showing poor cuttability, and the resultant texture grooves are too small to prevent the sticking of the magnetic head. On the other hand, if the average particle size of the abrasives exceeds 3 μm, the resultant texture grooves are so large that scratches are likely to be formed. The more preferred average particle size of the abrasives is 0.3–3 μm. For practical use, it is necessary to select abrasives having a particle size distribution suitable for the desired surface roughness from the above range. Incidentally, if single-crystalline alumina abrasives having an average particle size of 1 μm or less are used, the abrasives lose their edges to become rounded, resulting in extreme decrease in cuttability. Thus, in the case of the single-crystalline alumina abrasives, it is impossible to achieve as small an average particle size as in the present invention.

(3) Purity, etc.

The polycrystalline alumina constituting the abrasives of the present invention preferably has a purity of about 90–100%. Impurities except for the seeds and the modifiers are $SiO_2$, CaO, $Na_2O$, $K_2O$, etc.

(4) Crystal structure of abrasives

The sintered alumina produced by a sol-gel method generally has a polycrystalline structure. Since the alumina particles having a polycrystalline structure have sharper edge portions than single-crystalline fused alumina particles, the former is superior to the latter in capability of forming texture grooves.

(b) Grinding fluid

Grinding agents in the grinding fluid may be water-soluble, emulsion-type or water-insoluble. Water-soluble grinding agents are commercially available though not restricted thereto. Typical components of the grinding agents are materials to be emulsified such as mineral oils, animal or plant oils, ester oils and high-pressure additives; surfactants; rust-preventing agents such as amines; pH-maintaining agents such as triethanolamine; corrosion inhibitors such as triazine; defoamers such as silicone emulsions; coupling agents such as glycols; and water. The water-soluble grinding agents may be a translucent solution-type or a transparent semi-chemical solution-type, and the semi-chemical solution-type is more preferable from the viewpoint of washability of a textured surface. Also, there is an emulsion-type in which the grinding agents are emulsified by dilution with water, and the emulsion-type is classified to W/O emulsion and O/W emulsion. In any case, the dilution of the grinding agent is about 2–100 times.

With respect to the water-insoluble grinding agents, mixtures of mineral oils and animal or plant oils or ester oils, or high-pressure oils obtained by mixing these mixture oils with high-pressure chlorine or sulfur agents, etc., which are commercially available. These water-insoluble grinding agents may be mixed with surfactants, organic solvents such as alcohols, etc.

(c) Amount of abrasives

The amount of abrasives added to the grinding fluid is preferably 0.1–5 weight % based on the texturing composition. If the amount of abrasives is less than 0.1 weight %, sufficient texturing efficiency cannot be achieved. On the other hand, if the amount of abrasives exceeds 5 weight %, uniform texture grooves cannot be formed. The more preferred amount of the abrasives is 0.2–1 weight %.

(d) Other components

The texturing composition of the present invention may further contain organic or inorganic dispersants, etc. in amounts not exceeding 1 weight %.

[2] Texturing treatment (1) Magnetic disk to be treated

The magnetic disk 1 to be textured comprises a substrate 11 coated with a primer layer 12 as shown in FIG. 1. The substrate 11 is usually made of aluminum alloys, but the present invention is not restricted thereto and a glass substrate may also be used. The primer layer 12 may be formed by Ni—P planting, etc. It is preferable that the thickness of the primer layer 12 is generally 5–20 μm. The primer layer 12 formed by a planting method is subjected to a mirror-polishing to a surface roughness ($R_{max}$) of 0.05 μm or less before the texturing treatment.

(2) Formation of texture grooves

Figure 2:
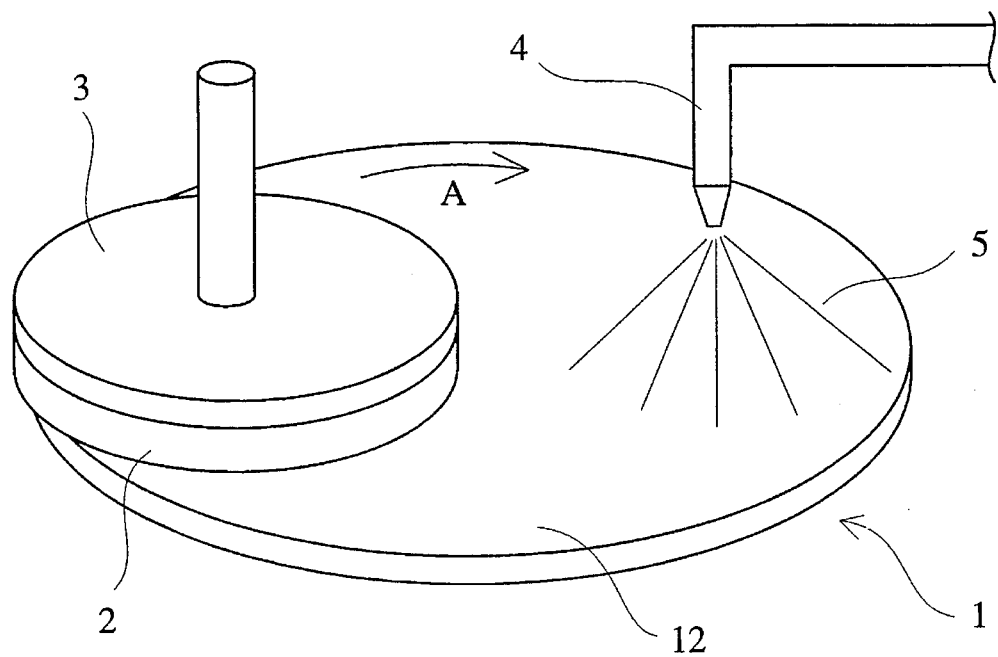
FIG. 2 is a schematic perspective view showing the texturing of the magnetic disk consisting of a substrate coated with a primer layer by using the texturing composition of the present invention.

As shown in FIG. 2, a jig 3 provided with a pad (felt) 2 is pressed onto a polished primer layer 12, and a magnetic disk 1 is rotated while supplying a grinding fluid 5 onto the primer layer 12 from a grinding fluid-supply apparatus 4 disposed on the upstream of the pad 2.

The pad 2 may be a pad constituted by implanted flexible fibers such as nylon yarns or a foamed pad of polyurethane, etc. The pressure of the pad 2 to the primer layer 12 is preferably about 0.1–0.5 kg/cm$^2$.

Figure 3:
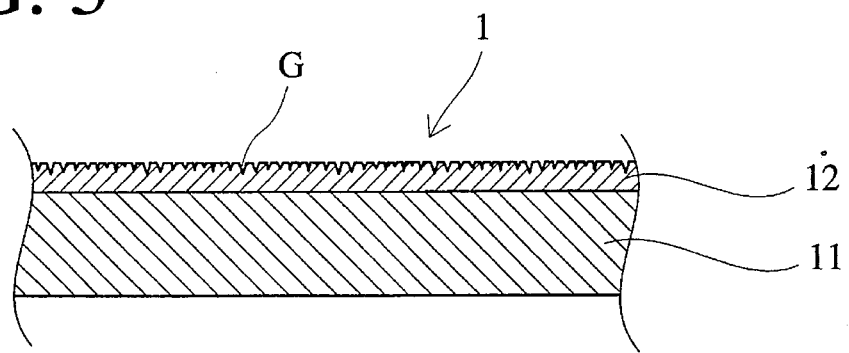
FIG. 3 is a radial cross-sectional view schematically showing the magnetic disk consisting of a substrate coated with a primer layer, which has been textured with the texturing composition of the present invention.

In the texturing treatment, the rotation speed of the magnetic disk 1 is preferably 50–200 rpm. If the magnetic disk 1 rotates slower than this range, the treatment speed is too low. On the other hand, if the magnetic disk 1 rotates faster than this range, non-uniformity in texturing takes place between inside and outside on the magnetic disk surface. The pad 2 may be stationary, it may be rotated, if necessary, in the same direction as that of the magnetic disk 1 at a speed of 1–10 rpm. Thus, texture grooves G as shown in FIG. 3 are formed. It should be noted that in the figures the texture grooves are exaggerated for explanation.

(3) Size of texture grooves

The texture grooves formed by such a texturing treatment are generally 0.1–5 μm in width and 0.01–0.1 μm in depth. If the width of the texture grooves is less than 0.1 μm, sufficient action of preventing the sticking of the magnetic head to the magnetic disk surface cannot be achieved. On the other hand, if the width exceeds 5 μm, friction with the magnetic head becomes too large.

In general, as the texture grooves become non-uniform with extremely large recesses such as scratches and projections such as burrs, a ratio of a maximum height ($R_{max}$, parameter of a surface roughness) to an average roughness (Ra) becomes larger. On the other hand, if the surface roughness is uniform, $R_{max}$ is small even with the same Ra. Accordingly, the uniformity of the texture grooves expressed by a ratio of $R_{max}$/Ra is preferably 10 or less.

(4) Scratches, etc.

In a case where abrasives having the same average particle size are used, scratches, if any, are twice or more larger than the other texture grooves in depth or width. Therefore, if there are scratches on the magnetic disk surface, the floating of the magnetic head is unstable, causing the crashing of the magnetic head onto the magnetic disk. Besides the scratches, burrs should not exist. Since the burrs are projections on the disk surface, the magnetic head is likely to crash with them if they are too large.

(5) Direction of texture grooves

In the embodiment shown in FIG. 2, the texture grooves are formed in a rotational direction of the magnetic disk (in a circular manner). Since the texture grooves in the rotational direction are parallel with the direction of relative movement of the magnetic head, they do not interfere with the magnetic head. Also, circular texture grooves may be formed such that circular texture grooves regularly cross each other at a predetermined angle (for instance, 15°). In any case, it is important to form texture grooves in such a manner that the magnetic head can fly stable.

(6) Formation of magnetic layer and protective layer

Figure 4:
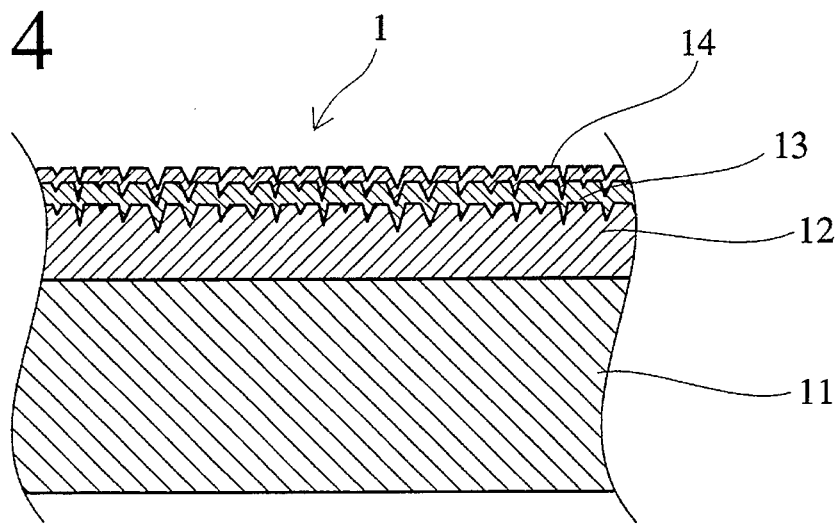
FIG. 4 is a radial cross-sectional view schematically showing the magnetic disk having a magnetic layer and a protective layer formed on the primer layer textured with the texturing composition of the present invention.

As shown in FIG. 4, the textured primer layer 12 is coated with a magnetic layer 13. Since the magnetic layer 13 is formed at a small thickness (generally 0.05–0.15 μm) by plating, sputtering, vapor deposition, etc., substantially the same texture grooves as those of the primer layer 12 appear on a surface of the magnetic layer 13. The magnetic layer 13 may have a known composition, for instance, Co—Ni, Co—Ni—Cr, Co—Ni—Pt, $\lambda$-$Fe_2O_3$, Co—NiTa, Co, etc. The protective layer 14 coated on the magnetic layer 13 is a thin layer (generally 0.01–0.03 μm) formed from a lubricating material such as carbon by sputtering, etc. Accordingly, substantially the same texture grooves as those of the primer layer 12 appear on a surface of the protective layer 14.

The present invention is described in further detail referring to the following Examples without intention of restricting the scope of the present invention.

EXAMPLES 1–3

A 3.5-inch-diameter aluminum substrate 11 for a magnetic disk coated with a 10-μm-thick primer layer 12 by Ni—P plating was mounted to an apparatus shown in FIG. 2 and rotated at a speed of 120 rpm. A texturing composition 5 having a formulation shown below was sprayed onto the primer layer 12 of the magnetic disk 1 from a grinding fluid supply apparatus 4.

Texturing composition (a) Polycrystalline sintered alumina abrasives (three types) prepared by sol-gel method
  Maximum particle size: 3.0 μm, 1.2 μm and 0.7 μm.
  Average particle size: 1.0 μm, 0.5 μm and 0.3 μm.
  Amount: 0.4 weight % based on the total of texturing composition.

(b) Grinding fluid
Semi-chemical solution-type grinding agent (Old JIS K-2241, cutting oil corresponding to W3) diluted with 50 times pure water and dispersed by ultrasonic vibration.

In this state, a jig 3 provided with an implanted nylon yarn pad 2 of 44 mm in diameter was pressed onto the magnetic disk 1 at a pressure of 0.3 kg/cm$^2$ while rotating at a speed of 5 rpm in the same direction as that of the magnetic disk 1, to carry out a texturing treatment for 1 minute.

After completion of the texturing treatment, the magnetic disk 1 was washed and dried. A texturing speed was determined from a weight reduction (weight before texturing—weight after texturing). The uniformity of texture grooves and the presence of burrs were observed by a differential interference microscope (BHMJL-33MD available from Olympus Optical Co., Ltd., magnification: 200 times) and a dark field microscope (BHMJL-33MD available from Olympus Optical Co., Ltd., magnification: 200 times), and the presence of scratches was observed by a special mercury lamp (F-100Z available from Funakoshi Pharmaceutical K. K.). Also, the surface roughness (maximum height $R_{max}$ and center-line average roughness Ra) of the textured primer layer 12 was measured by Tarystep and Tarydata 2000 both available from Rank Taylor Bobson, and the uniformity of texture grooves was evaluated by a ratio of $R_{max}$/Ra. The results are shown in Table 1.

Figure 5:
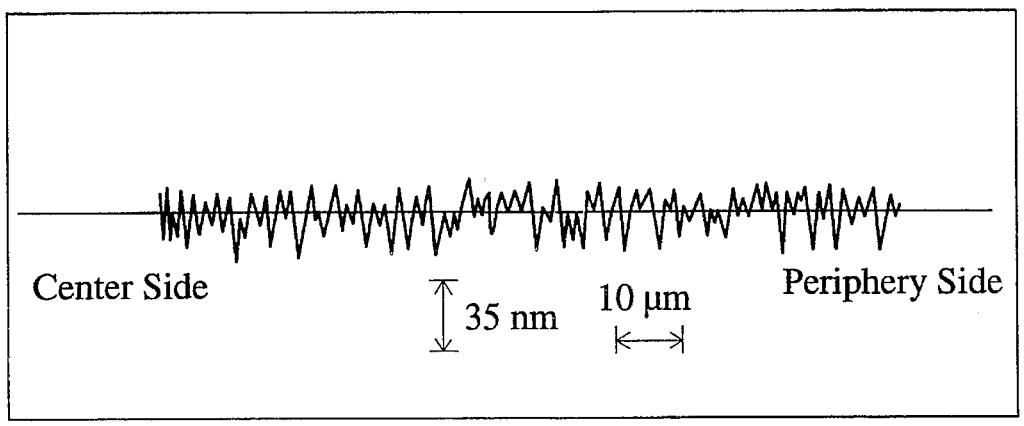
FIG. 5 is a graph showing a radial surface roughness distribution of the primer layer of the magnetic disk textured in Example 1.

Also, in the case of using polycrystalline sintered alumina abrasives having an average particle size of 1.0 μm (Example 1), a radial surface roughness distribution of the magnetic disk was measured by Tarystep. The results are shown in FIG. 5.

To evaluate CSS characteristics, the textured primer layer 12 was coated with a 100-nm-thick Cr layer, a 40-nm-thick Co—12Cr—2Ta magnetic layer and a 25-nm-thick carbon protective layer in this order by a DC sputtering apparatus, and finally a lubricating material (perfluoropolyether) was applied thereto at a thickness of 2 nm. The magnetic disk thus produced was assembled into a hard disk drive (magnetic head load: 5 g), accelerated from a stop position to a rotation speed of 3,600 rpm and then stopped. By repeating a cycle (CSS cycle) of rotating up to the above speed and stopping, relations between the number of CSS cycles and a friction coefficient μ were determined. The results are shown in Table 1.

With respect to those which could withstand up to 20,000 CSS cycles, the friction coefficient μ is shown, and with respect to those in which the magnetic head was broken, the number of CSS cycles at a time of breakage are shown. Also, the magnetic disk having burrs confirmed by a microscopic observation did not undergo the CSS test.

Comparative Examples 1–3

Using the same texturing composition as in Examples 1–3 except for containing fused alumina abrasives (White Morandom WA available from Showa Denko K. K.) instead of the polycrystalline sintered alumina abrasives, a Ni—P plating primer layer 12 of the magnetic disk 1 was textured to carry out the same evaluation tests as in Examples. Each of the fused alumina abrasives used in Comparative Examples 1–3 had a maximum particle size and an average particle size shown in Table 1.

Figure 6:
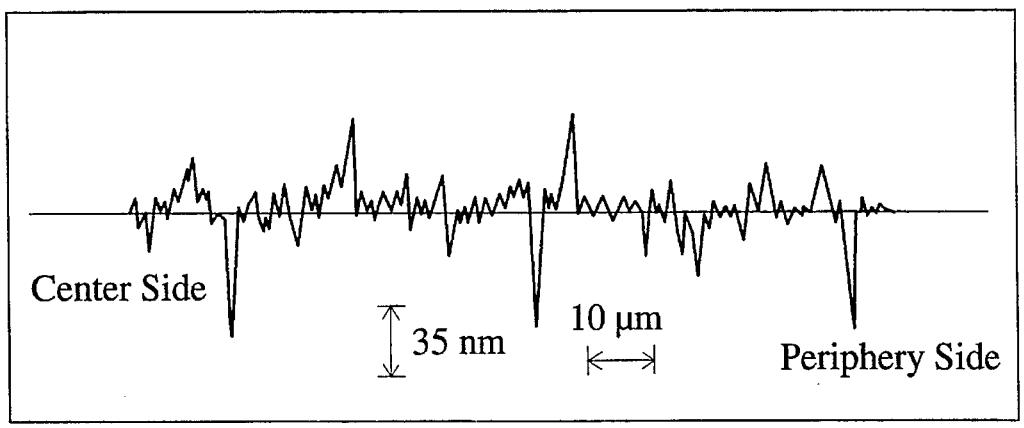
FIG. 6 is a graph showing a radial surface roughness distribution of the primer layer of the magnetic disk textured in Comparative Example 1.

Also, in the case of using fused alumina abrasives having an average particle size of 1.0 μm (Comparative Example 1), a radial surface roughness distribution of the magnetic disk was measured by Tarystep. The results are shown in FIG. 6.

TABLE 1

| No. | Particle Size (μm) Maximum | Particle Size (μm) Average | Texturing Speed (mg/min.) | Rmax (Å) | Ra (Å) |
|---|---|---|---|---|---|
| Example | | | | | |
| 1 | 3.0 | 1.0 | 6.2 | 342 | 50 |
| 2 | 1.2 | 0.5 | 4.2 | 181 | 30 |
| 3 | 0.7 | 0.3 | 2.6 | 75 | 15 |
| Comparative Example | | | | | |
| 1 | 3.0 | 1.0 | 5.8 | 439 | 52 |
| 2 | 1.2 | 0.5 | 0.8 | 215 | 32 |
| 3 | 0.7 | 0.3 | 0.3 | 107 | 18 |

| No. | Rmax/Ra | Burrs[1] | Scratches[2] | CSS Characteristics[3] |
|---|---|---|---|---|
| Example | | | | |
| 1 | 6.8 | 0 | 0 | μ = 0.5 |
| 2 | 6.0 | 0 | 0 | μ = 0.5 |
| 3 | 5.0 | 0 | 0 | μ = 0.6 |
| Comparative Example | | | | |
| 1 | 8.4 | 150 | 5 | — |
| 2 | 6.7 | 20 | 12 | — |
| 3 | 5.9 | 0 | 15 | L = 13,000 |

Note:
[1] Number of burrs (length: 1 μm or more, height: 0.1 μm or more) observed in one field by a differential interference microscope (magnification: 500 times).
[2] Number of scratches (twice or more larger than other texture grooves in width or depth) in one surface when observed by lighting a magnetic disk surface with a special mercury lamp in a dark room.
[3] Friction coefficient μ when 20,000 CSS cycles were completed. If a magnetic head was broken in the course of the CSS cycles, the number L of CSS cycles at a time of breakage is shown.

As is clear from Table 1, the use of the polycrystalline sintered alumina abrasives of the present invention makes it possible to achieve a higher texturing speed than using the fused alumina abrasives, and this tendency is remarkable at an average particle size of 0.5 μm or less. Also, the polycrystalline sintered alumina abrasives of the present invention can provide a smaller ratio of $R_{max}/Ra$ than that of the fused alumina abrasives, thereby forming more uniform texture grooves with less surface defects such as scratches and burrs, etc. As is clear from comparison between FIGS. 5 and 6, the polycrystalline sintered alumina abrasives of the present invention can form much more uniform texture grooves than the conventional fused alumina abrasives.

As described above, since the polycrystalline sintered alumina abrasives of the present invention can form uniform texture grooves, a finished magnetic disk having a magnetic layer and a protective layer coated on a primer layer textured with the polycrystalline sintered alumina abrasives of the present invention shows extremely good CSS characteristics with sufficiently low friction coefficient even after 20,000 CSS cycles, while the magnetic disks of Comparative Examples could not withstand 20,000 CSS cycles.

The composition for texturing a magnetic disk according to the present invention which contains abrasives obtained by pulverizing and classifying polycrystalline sintered alumina produced by a sol-gel method has the following advantages:

(1) A high texturing speed can be achieved, and this effect is particularly remarkable at a particle size of 1 μm or less for a high recording density.

(2) Uniform texture grooves with a small ratio of $R_{max}/Ra$ are obtained.

(3) A textured surface with less defects such as scratches, burrs, etc. can be obtained.

(4) When the particle sizes of abrasives are reduced, fine and uniform texture grooves are obtained.

(5) A magnetic disk having a magnetic layer and a protective layer coated on a primer layer with such uniform texture grooves shows extremely good CSS characteristics, thereby enjoying reduced recording errors and high record density.

What is claimed is:

1. A composition for texturing a magnetic disk comprising abrasives of polycrystalline sintered alumina prepared by a sol-gel method, and a grinding fluid.

2. The composition for texturing a magnetic disk according to claim 1, wherein the abrasives are present in an amount of 0.1–5 weight % based on the total texturing composition, said abrasives having a maximum particle size of 5 μm or less and an average particle size of 0.1–3 μm.

3. The composition for texturing a magnetic disk according to claim 1, wherein said abrasives are produced by a sol-gel method comprising the steps of mixing a slurry of alumina hydrate with a dilute acid for solation, mixing the resultant alumina hydrate sol with a seed and/or a modifier, drying said alumina hydrate sol at 50°–120° C. for gelation, pulverizing and classifying the resultant gel, calcining said gel at 400°–900° C., sintering the calcined alumina particles at 1100°–1400° C., and pulverizing and classifying the resultant sintered alumina particles to a maximum particle size of 5 μm or less and an average particle size of 0.1–3 μm.

4. The composition for texturing a magnetic disk according to claim 1, wherein said polycrystalline sintered alumina abrasives have an average crystal grain size of 0.01–1.0 μm.

5. The composition for texturing a magnetic disk according to claim 2, wherein said polycrystalline sintered alumina abrasives have an average crystal grain size of 0.01–1.0 μm.

6. The composition for texturing a magnetic disk according to claim 3, wherein said polycrystalline sintered alumina abrasives have an average crystal grain size of 0.01–1.0 μm.

* * * * *